United States Patent
Takeuchi et al.

(10) Patent No.: US 6,625,090 B1
(45) Date of Patent: Sep. 23, 2003

(54) MAGNETO-OPTICAL RECORDING MEDIUM, AND MAGNETO-OPTICAL RECORDING/REPRODUCING APPARATUS

(75) Inventors: Atsushi Takeuchi, Miyagi (JP); Yoshihito Fukushima, Miyagi (JP); Hiroyuki Takemoto, Miyagi (JP); Kenichi Itoh, Kanagawa (JP); Mineo Moribe, Kanagawa (JP); Takehiko Numata, Kanagawa (JP)

(73) Assignees: Sony Corporation, Tokyo (JP); Fujitsu Limited, Kanagawa (JP)

( * ) Notice: Subject to any disclaimer, the term of this patent is extended or adjusted under 35 U.S.C. 154(b) by 0 days.

(21) Appl. No.: 09/366,713

(22) Filed: Aug. 4, 1999

(30) Foreign Application Priority Data

Aug. 7, 1998 (JP) .......................... P10-224744

(51) Int. Cl.[7] .............................. G11B 11/00
(52) U.S. Cl. .................. 369/13.42; 369/13.14
(58) Field of Search ............. 369/13.44, 13.46, 369/275.2, 13.42, 13.08, 116, 13.1, 275.4, 13.47, 13.55, 275.1, 275.3, 13.45, 13.14, 13.4; 365/122; 428/694 ML

(56) References Cited

U.S. PATENT DOCUMENTS

| 5,241,520 | A |   | 8/1993  | Ohta et al. |
| 5,414,652 | A |   | 5/1995  | Mieda et al. |
| 5,422,874 | A |   | 6/1995  | Birukawa et al. |
| 5,623,458 | A |   | 4/1997  | Matsumoto et al. |
| 5,627,777 | A |   | 5/1997  | Tamanoi et al. |
| 5,640,374 | A |   | 6/1997  | Hirokane et al. |
| 5,864,520 | A | * | 1/1999  | Fukamachi et al. ........... 369/13 |
| 5,966,350 | A | * | 10/1999 | Tanaka et al. ................. 369/13 |

FOREIGN PATENT DOCUMENTS

| EP | 0604065 | 6/1994 |
| EP | 0654786 | 5/1995 |
| EP | 0668586 | 8/1995 |
| EP | 0686970 | 12/1995 |

* cited by examiner

*Primary Examiner*—Ali Neyzari
(74) *Attorney, Agent, or Firm*—Sonnenschein, Nath & Rosenthal, LLP

(57) ABSTRACT

Using MSR (magnetically induced super-resolution) technology, a read-head field is applied to a magneto-optical recording medium when reading an information signal from a recording layer of a magneto-optical recording medium, in order to magnetize the read light-irradiated magnetic layer in one direction in a part of an area within the read light spot. The magneto-optical recording medium using MSR technology adopts the on-land recording method in which an information signal is written to the land, which enables read of an information signal by the MSR technology with a smaller read-head field.

18 Claims, 7 Drawing Sheets

MAGNETO-OPTICAL RECORDING MEDIUM, AND MAGNETO-OPTICAL RECORDING/REPRODUCING APPARATUS

BACKGROUND OF THE INVENTION

The present invention relates to a magneto-optical recording medium in which the magnetically induced super-resolution technology is applied, and more particularly, to a magneto-optical recording/reproducing apparatus for such a magneto-optical recording medium.

To attain higher density of recording in a magneto-optical recording medium, magnetically induced super-resolution (MSR) technology has been proposed. With MSR technology the recording layer of a magneto-optical recording medium is formed from a minimum of three magnetic layers and magnetic switched coupling between the magnetic layers is utilized to assure a higher resolution than would be determined by the wavelength of a read light used.

MSR technology includes, for example, the FAD (front aperture detection) method in which the magnetic layer on the read light-irradiated side of a medium is magnetized in one direction in a high temperature area within a read light spot to detect signals from only a low temperature area, the RAD (rear aperture detection) method in which the magnetic layer on the read light-irradiated side is magnetized in one direction in a low temperature area within a read light spot to detect signals from only a high temperature area, the double-mask RAD method in which the magnetic layer on the read light-irradiated side is magnetized in one direction in the high and low temperature areas, respectively, within a read light spot to detect signals from only an intermediate temperature area between the high and low temperature areas, etc.

In all these methods, the area from which a signal is read by a read beam spot is narrow, which results in the same effect as would be obtained by reducing the size of the read beam spot. Therefore, it is possible to attain a higher density of recording in the magneto-optical recording medium than a resolution determined by the wavelength of a read light used.

To implement the above-mentioned MSR technology, when a read light is irradiated onto a magneto-optical recording medium to read information signals from the magneto-optical recording medium, it is necessary to apply a magnetic field to the magneto-optical recording medium in order to magnetize a part of the magneto-optical recording medium within a read light spot in one direction. The magnetic field will be referred to as "read-head field" hereinunder.

To enable use of MSR technology, the read-head field should desirably be reduced in strength. If a large read-head field has to be applied to enable the MSR technology, however, a magneto-optical recording/reproducing apparatus for use with the magneto-optical recording medium has to be provided with a special magnetic head which can apply such a large read-head field.

However, the magneto-optical recording apparatus basically comprises a writing magnetic head as a means for developing a magnetic field. When the read-head field may be small, the write head can be used to apply a read-head field.

SUMMARY OF THE INVENTION

Accordingly, the an object of the present invention is to overcome the above- mentioned drawbacks of the prior art by providing a magneto-optical recording medium in which MSR technology is applied and from which an information signal can be read with a small read-head field, and to provide a magneto-optical recording/reproducing apparatus adapted to read and write an information signal to/from such a magneto-optical recording medium.

The above object can be attained by providing a magneto-optical recording medium having:

a substrate having lands and grooves formed along a recording track; and a recording layer formed on the substrate and consisting of a stack of at least three magnetic layers;

an information signal being written to the magneto-optical recording medium by the on-land recording method in which the information signal is written to the land; and for reading the information signal from the magneto-optical recording medium, a magnetic field being applied to the magneto-optical recording medium so that a magnetic layer irradiated with a read light is magnetized in one direction in a part of the magnetic layer within a read light spot.

Because of the on-land recording method adopted, the MSR technology can be utilized to read an information signal from this magneto-optical recording medium with a smaller read-head field.

According to another aspect of the present invention, the magneto-optical recording medium should preferably be adapted such that when an information signal written on the magneto-optical recording medium is read, a read-head magnetic head is applied for the magnetic layer irradiated with a read light to be magnetized in predetermined directions in front and rear portions, respectively, lying in relation to the moving direction of the read light spot, of an area within the read light spot. In other words, the magneto-optical recording medium should preferably adopt the double-mask RAD method in the MSR technology. In the MSR technology, in particular, the double-mask RAD method attains a high resolution and thus permits to enable a higher density of recording in the magneto-optical recording medium.

According to another aspect of the present invention, the read-head field should preferably be 28,000 A/m or less in strength. The size of a magnetic field developed by a writing magnetic head provided in an ordinary magneto-optical recording/reproducing apparatus is on the order of 20,000 to 28,000 A/m. Therefore, by limiting the size of the read-head field to less than 28,000 A/m, it is possible to use the writing magnetic head as a magnetic head for application of a read-head field.

According to another aspect of the present invention, the magneto-optical recording medium should preferably be formed like a disc and have a plurality of recording bands defined by dividing a recording area thereof radially, the magneto-optical recording medium being spun at a predetermined speed with a write or read light focused within at least each of the recording bands when an information signal is written or read to/from the magneto-optical recording medium, the rotational speed or reference clock frequency being changed for each of the recording bands. In other words, the magneto-optical recording medium should preferably adopt the ZCAV (zone constant angular velocity) method. Adoption of the ZCAV method allows for an improved recording density without complicating the rotation drive circuitry of the magneto-optical recording/reproducing apparatus.

According to another aspect of the present invention, the magneto-optical recording medium should preferably be adapted such that when information signals written on the magneto-optical recording medium are read, a read-head magnetic head field is applied for the magnetic layer irradiated with a read light to be magnetized in predetermined directions in front and rear portions, respectively, lying in relation to the moving direction of the read light spot, of an area within the read light spot. In other words, the magneto-optical recording medium should preferably adopt the double-mask RAD method in the MSR technology. In the MSR technology, in particular, the double-mask RAD method attains a high resolution and thus permits to enable a higher density of recording in the magneto-optical recording medium.

According to another aspect of the present invention, to make the shortest recording pit length in the magneto-optical recording area smaller than that in the pit area, the shortest recording pit length in the pit area should preferably be an integral multiple of that in the magneto-optical recording area.

According to another aspect of the present invention, to make the shortest recording pit length in the magneto-optical recording area smaller than that in the pit area, the shortest recording pit length in the magneto-optical recording area should preferably be 0.38 $\mu$m or less and the shortest recording pit length in the pit area be 0.76 $\mu$m or less. Also, according to another aspect of the present invention, the track pitch should preferably be 0.9 $\mu$m or less.

Currently, a 3.5-inch magneto-optical disc having a 640 MB capacity (conforming to ISO/IEC 15041; and referred to as "5-fold density 3.5-inch magneto-optical disc" herein) has been developed. By designing a 3.5-inch magneto-optical disc in which the shortest recording pit length in the magneto-optical recording area is 0.38 $\mu$m or less, that in the pit area is 0.76 $\mu$m or less and track pitch is 0.9 $\mu$m or less, it is possible to provide a 3.5-inch magneto-optical disc having a capacity two times larger than that of the 5-fold 3.5-inch magneto-optical disc, namely, provide a "10-fold density 3.5-inch magneto-optical disc."

Also the above object can be attained by providing a magneto-optical recording/reproducing apparatus for writing and/or reading an information signal to/from a magneto-optical recording medium having a substrate with lands and grooves formed along a recording track; and a recording layer formed on the substrate and consisting of a stack of at least three magnetic layers, the apparatus being adapted, according to the present invention, to:

write an information signal to the magneto-optical recording medium by the on-land recording method in which the information signal is written to the land; and apply a magnetic field to the magneto-optical recording medium when reading an information signal written on the magneto-optical recording medium; so that a magnetic layer irradiated with a read light is magnetized in one direction in a part of the magnetic layer within a read light spot. The magneto-optical recording/reproducing apparatus adopts the on-land recording method to permit reading of an information signal using MSR technology by applying a smaller read-head field.

According to another aspect of the present invention, the magneto-optical recording/reproducing apparatus should preferably comprises:

means for optimizing the strength of a magnetic field applied to the magneto-optical recording medium to read an information signal from the magneto-optical recording medium;

means for optimizing the intensity of a light irradiated to the magneto-optical recording medium to read the information signal from the magneto-optical recording medium; and means for optimizing the intensity of a light irradiated to the magneto-optical recording medium to write an information signal to the magneto-optical recording medium. These means enable information signal write and read under optimum conditions.

According to another aspect of the present invention, the magneto-optical recording/reproducing apparatus should preferably be adapted such that when an information signal written on the magneto-optical recording medium is read, a read-head magnetic head is applied to the magnetic layer irradiated with a read light to be magnetized in predetermined directions in front and rear portions, respectively, lying in relation to the moving direction of the read light spot, of an area within the read light spot. In other words, the magneto-optical recording/reproducing apparatus should preferably adopt the double-mask RAD method in the MSR technology. With MSR technology, in particular, the double-mask RAD method attains a high resolution and thus permits to enable a higher density of recording in the magneto-optical recording medium.

According to another aspect of the present invention, the read-head field should preferably be 28,000 A/m or less in strength. The size of magnetic field developed by a writing magnetic head provided in an ordinary magneto-optical recording/reproducing apparatus is on the order of 20,000 to 28,000 A/m. Therefore, by limiting the size of the read-head field to less than 28,000 A/m, it is possible to use the writing magnetic head as a magnetic head for application of a read-head field.

According to another aspect of the present invention, the magneto-optical recording medium for use with the magneto-optical recording/reproducing apparatus should preferably be formed like a disc and have a plurality of recording bands defined by dividing a recording area radially thereof, the magneto-optical recording medium being spun at a predetermined speed with a write or read light focused within at least each of the recording bands when an information signal is written or read to/from the magneto-optical recording medium, the rotational speed or reference clock frequency being changed for each of the recording bands. In other words, the magneto-optical recording medium should preferably adopt the ZCAV (zone constant angular velocity) method. Adoption of the ZCAV method permits to improve the recording density without complicating the rotation drive circuitry of the magneto-optical recording/reproducing apparatus.

According to another aspect of the present invention, for use with a magneto-optical medium having a magneto-optical recording area in which an information signal is recorded by magneto-optical recording, and a pit area in which an information signal is pre-recorded by a convex-concave pattern, the magneto-optical recording/reproducing apparatus should preferably comprise:

means for generating a read clock corresponding to a recording pit length in the magneto-optical recording area; and means for generating a read clock corresponding to a recording pit length in the pit area. These clock generating means permit normal write and/or read even when the recording pit length in the magneto-optical recording area is different from that in the pit area.

The provision of the above-mentioned magneto-optical recording area reading clock generating means and pit area reading clock generating means enables a magneto-optical recording/reproducing apparatus for use with a 10-fold density 3.5-inch magneto-optical recording medium in which the shortest recording pit length in the magneto-optical recording area is 0.38 µm or less, that in the pit area is 0.76 µm or less and track pitch is 0.9 µm or less, for example.

These objects and other objects, features and advantages of the present intention will become more apparent from the following detailed description of the preferred embodiments of the present invention when taken in conjunction with the accompanying drawings.

These and other features of the invention are discussed in greater detail below in the following detailed description of the presently preferred embodiments with reference to the accompanying drawings.

BRIEF DESCRIPTION OF THE DRAWINGS

FIG. 3 explains a signal reproduction with a MSR (magnetically induced super-resolution) technology using the double-mask RAD (read aperture detection), in which FIG. 3A is a plan view of the magneto-optical disc, showing focusing of read light for signal read and FIG. 3B schematically illustrates magnetization, for reading, of each of layers forming together the recording layer;

DETAILED DESCRIPTION OF THE PRESENTLY PREFERRED EMBODIMENTS

Magneto-optical Recording Medium

The embodiment of a magneto-optical recording medium according to the present invention will be described herein using a 3.5-inch magneto-optical disc as an example.

The magneto-optical disc taken as an example for the simplicity of the illustration 30 and description in the following is assumed to be a 10-fold density 3.5-inch magneto-optical disc having a capacity of 1.28 GB, which is two times larger than that of a 5-fold density 3.5-inch magneto-optical disc and which can stand in for the 5-fold density 3.5-inch magneto-optical disc.

Figure 1:
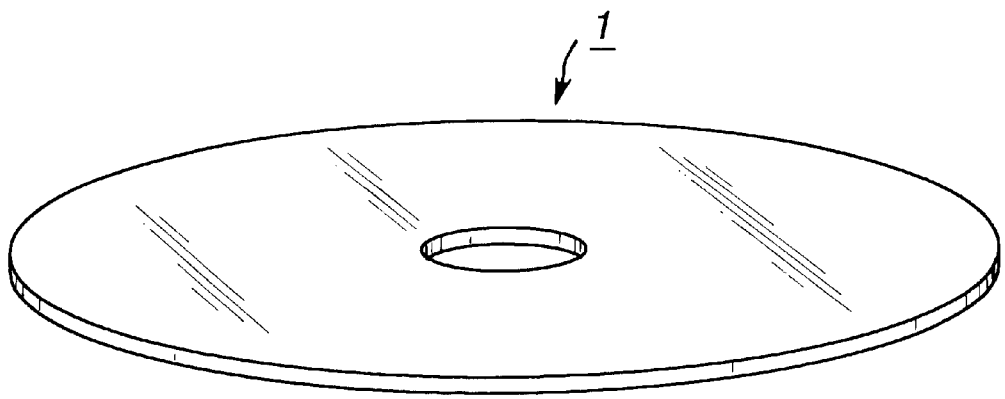
FIG. 1 is a schematic perspective view of an embodiment of magneto-optical disc according to the present invention.

Referring now to FIG. 1, there is schematically illustrated a magneto-optical disc 1. As shown, the magneto-optical disc 1 is formed to be a 3.5-inch disc with a circular hole formed at the center therein. The magneto-optical disc 1 comprises a 3.5-inch substrate having a circular hole formed at the center therein and having formed thereon a recording layer to which an information signal is written by the magneto-optical recording and a protective layer to protect the recording layer. Note that the magneto-optical disc 1 may be provided with a hub (not shown) to chuck the magneto-optical disc 1 to the rotation drive. Also, the magneto-optical disc 1 may be housed in a disc cartridge.

Further, the magneto-optical disc 1 has a tracking servo groove formed spirally thereon along a recording track. An information signal is written to a land between the grooves by the magneto-optical recording. Namely, the magnet-optical disc 1 adopts the on-land recording method. When an information signal is written and/or read to/from the magneto-optical disc 1, a light beam spot travels on the land.

Figure 2:
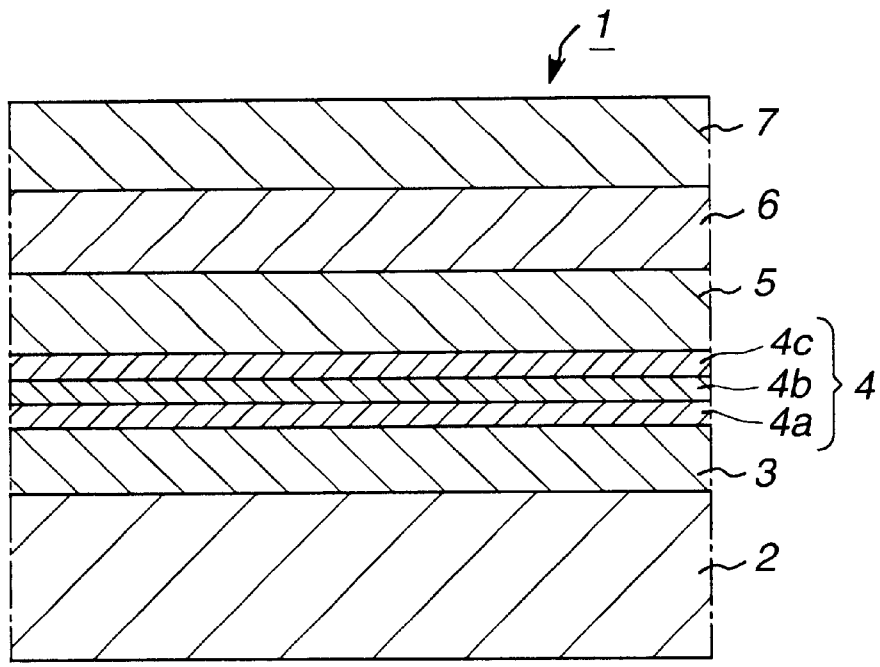
FIG. 2 is a sectional view of the embodiment of magneto-optical disc according to the present invention, showing the layer structure thereof.

The magneto-optical disc 1 is constructed as shown in FIG. 2. As shown, the magneto-optical disc 1 comprises a polycarbonate made substrate 2, a dielectric layer 3 made of SiN, a recording layer 4, a dielectric layer 5 made of SiN, and a reflective layer 6 made of Al. These layers are formed on the substrate 2 by gas sputtering. Further, a protective layer 7 is formed from an ultra-violet curable resin on the reflective layer 6 by spin coating.

To enable signal reading with MSR technology with the double-mask method, the recording layer 4 is formed from a stack of multiple magnetic layers. Namely, the magnetic layers of the recording layer 4 include a read-out layer 4a made of GdFeCo, an intermediate layer 4b made of GdFe and a recorded-status keeping layer 4c made of TbFeCo.

The recorded-status keeping layer 4c is provided for a recorded information signal. That is, in the magneto-optical disc 1, an information signal is written as a magnetized direction of the recorded-status keeping layer 4c. The intermediate layer 4b is provided to control the magnetic coupling between the read-out layer 4a and recorded-status keeping layer 4c during signal reproduction using MSR technology with the double-mask RAD method. The read-out layer 4a is a magnetic layer upon which read light is incident and which is applied with a magnetic field, at the time of signal reading with MSR technology with the double-mask RAD method, so that a part of the area within a read light spot is magnetized in one direction.

It should be noted that in the present invention, the recording layer 4 has only to be formed from a stack of at least three magnetic layers and the construction of each of the layers formed on the substrate 2, materials for the layers and method of forming the layers are not limited to the above-mentioned ones.

To read an information signal from the magneto-optical disc 1, MSR technology with the double-mask RAD method is used. The signal reproduction by the MSR technology with the double-mask RAD method will be described herebelow with reference to FIG. 3 in which FIG. 3A is a plan view of the magneto-optical disc 1, showing focusing of read light for signal reading and FIG. 3B schematically illustrates magnetization, for reading, of each of layers forming together the recording layer 4.

Figure 3:
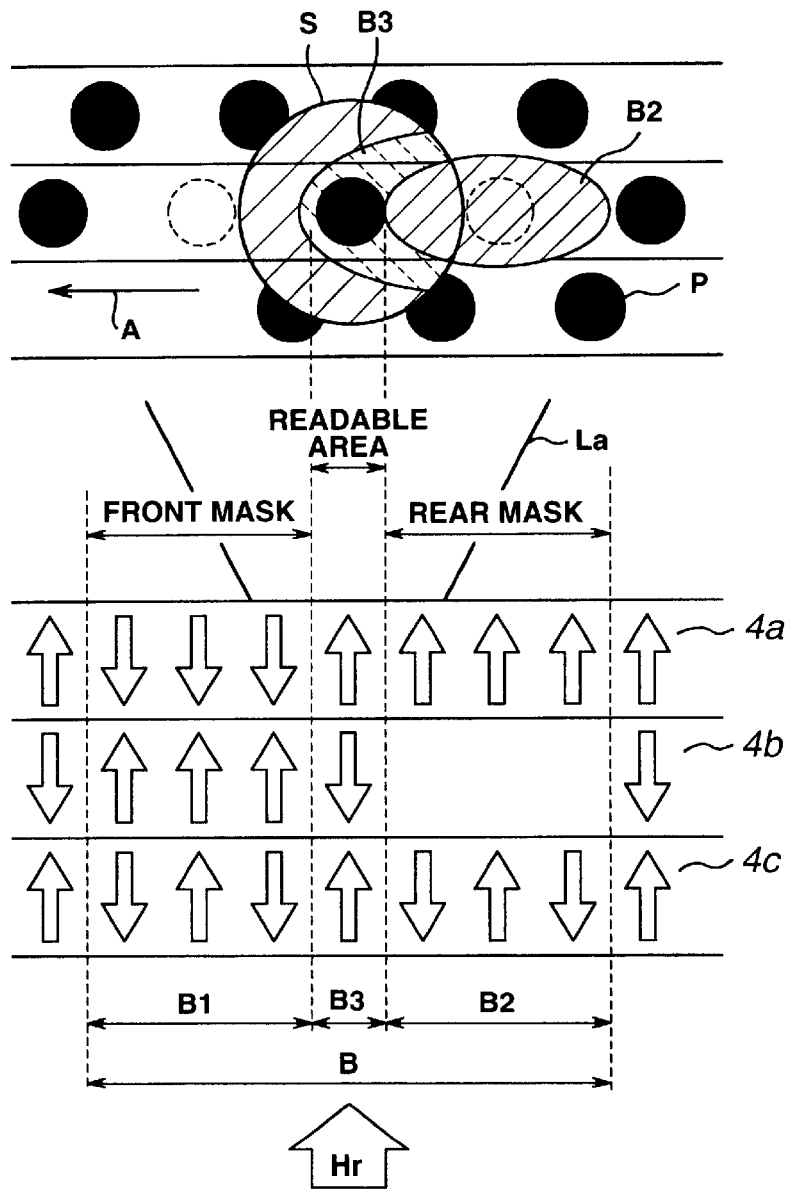

As shown in FIG. 3, to read an information signal from the magneto-optical disc 1, a read light La is irradiated to the magneto-optical disc 1 from the side of the read-out layer 4a and a read-head field Hr is applied to an area within a read light spot S of the read light La while the magneto-optical disc 1 is being spun. Note that the arrow A indicates the moving direction of the read light spot S, the arrow Hr indicates the read-head field and a reference B indicates an area to which the read-head field Hr is applied.

As shown in FIG. 3B, the area B to which the read-head field Hr is applied includes an area B1 positioned at the front relative to the moving direction of the read light spot S and where the temperature is relatively low, an area B2 positioned at the rear relative to the moving direction A of the read light spot S and where the temperature is relatively high, and an area B3 positioned in the center and where the temperature is higher than that in the area B1 and lower than that in the area B2.

At this time, the read-out layer 4a is initialized in the low-temperature area B1 by the applied read-head field Hr. The read-out layer 4a in the low-temperature area B1 is magnetized always in one direction independently of the magnetized direction of the recorded-status keeping layer 4c. As a result, the low-temperature area B1 will serve as a so-called front mask to mask an area before the read light spot S.

In the high-temperature area B2, the intermediate layer 4b is demagnetized and the magnetic switched coupling in the recording layer 4 ceases. The read-out layer 4a in the high-temperature area B2 is magnetized always in the direction of the read-head field Hr irrespectively of the magnetized direction of the recorded-status keeping layer 4c. As a result, the high-temperature area B2 will serve as a so-called rear mask to mask an area following or behind the read light spot S.

On the other hand, in the intermediate-temperature area B3, the intermediate layer 4b is vertically magnetized, a magnetic switched coupling takes place, and the magnetization of the recorded-status keeping layer 4c spreads to the read-out layer 4a which will thus be magnetized in a direction corresponding to the magnetized direction of the recorded-status keeping layer 4c. As a result, only the intermediate-temperature are B3 between the front and rear masks will be readable.

As in the above, a front mask is defined before the read light spot S while a rear mask is defined after the read light spot S. Thus; only in the intermediate-temperature area B3 between the front and rear masks, the read-out layer 4a is magnetized in a direction corresponding to the magnetized direction of the recorded-status keeping layer 4c. This results in a narrow area readable by the read light spot S. Even if the magneto-optical disc 1 is designed for such a recording density that the read light spot S covers a plurality of recording pits P, an information signal can be read from only one of such recording pits.

Use of the MSR technology with the double-mask RAD method permits to form recording pits P smaller than the read light spot S. More particularly, even a similar optical system to that for a 5-fold density 3.5-inch magneto-optical disc can be used to form recording pit length of less than 0.4 µm.

Thus, in the magneto-optical disc 1, the shortest recording pit length is 0.38 µm. In the 5-fold density 3.5-inch magneto-optical disc, the wavelength λ of read light is 680 nm arid the numeral aperture NA of the objective lens for focusing the read light is 0.55. However, use, of the MSR technology with the double-mask RAD method enables a similar optical system to that for the 5-fold density 3.5-inch magneto-optical disc to read signal satisfactorily even when the shortest recording pit length is 0.38 µm.

To adopt the above-mentioned MSR technology, it is necessary to apply a read-head field Hr when reproducing an information signal from the magneto-optical disc. However, the necessary read-head field Hr for the MSR technology should desirably be as small as possible.

Since the magneto-optical disc 1 according to the present invention adopts the on-land recording method, the necessary read-head field Hr may be small, which fact was found by the Inventor of the present invention through trial manufacture of many magneto-optical discs and repetition of experiments on them. The Inventor's further trial manufacture and repeated experiments of magneto-optical discs proved that the necessary read-head field Hr for the MSR technology may be 4,000 A/m or more smaller in the on-land recording method in which an information signal is recorded on the land than in the in-groove recording method in which an information signal is recorded in the groove even when the recording layer in the former case is the same as in the latter case.

Owing to the on-land recording method thus adopted in the magneto-optical disc 1, a small read-head field Hr may be used for the MSR technology. In particular, even a read-head field Hr of 20,000 to 28,000 A/m will enable a sufficient MSR.

A magneto-optical recording/reproducing apparatus using a similar optical system to that (wavelength λ of read light is 680 nm and numerical aperture NA is 0.55) used in a magneto-optical recording/reproducing apparatus for use with a 5-fold density 3.5-inch magneto-optical disc 1 was used to write and read a random pattern of which the shortest recording pit length is 0.38 µm. The write power margin was measured as will be described below. The result is shown in FIG. 4.

The write power margin was measured with a read laser power Pr of 3.5 mW, linear velocity V of 7.9 m/s, channel clock T of 24 nsec and a read-head field Hr of 24,000 A/m and also a read-head field Hr of 20,000 A/m. FIG. 4 show the dependence on the write laser power of a ratio (jitter) with a channel clock T varying along the time base of a read signal produced by write and read of the random pattern under the above-mentioned conditions.

Figure 4:
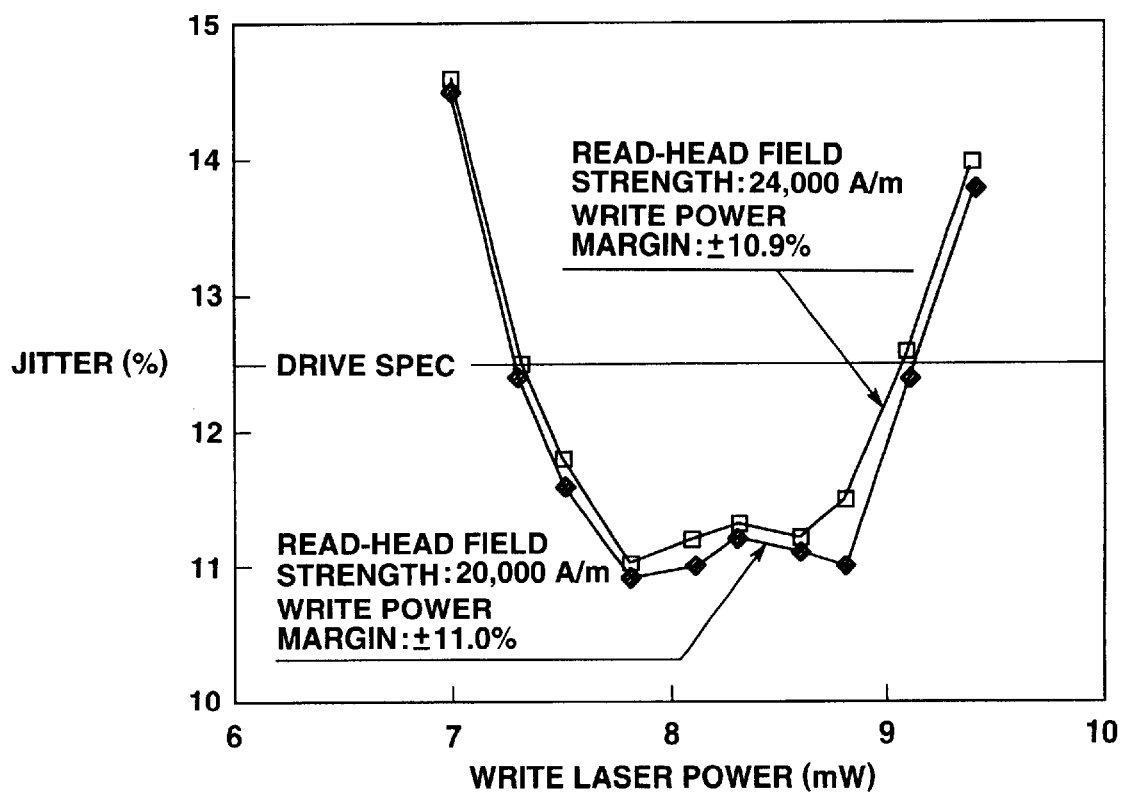
FIG. 4 graphically shows the dependence on write laser power of jitter of the embodiment of magneto-optical disc according to the present invention.

As shown in FIG. 4, when the signal was read with the read-head field Hr of 24,000 A/m, the write power margin was ±10.9%; and when the signal was read with the read-head field Hr of 20,000 A/m, the write power margin was ±11.0%. Thus, the magneto-optical disc 1 can assure a write power margin of more than ±10% even with a read-head field Hr as small as 20,000 A/m. In the magneto-optical recording/reproducing apparatus for use with the currently available 5-fold density 3.5-inch magneto-optical disc, an optimum write laser power is determined by writing and reading an information signal with the write laser power changed in a predetermined area before writing the information signal to the magneto-optical disc. On condition that such operations are done, it suffices for the magneto-optical disc 1 to assure a write power margin of ±10%.

As having been described in the foregoing, the necessary read-head field Hr for the MSR may be small for the magneto-optical disc 1 which can thus read signal even with a read-head field Hr of less than 28,000 A/m. More specifically, the read-head field Hr of about 20,000 to 24,000 A/m is sufficient for the magneto-optical disc 1. The read magnetic head used in the ordinary magneto-optical recording/reproducing apparatus can generate such a magnetic field. Therefore, the magneto-optical disc 1 can be used to allow the write magnetic head to be used satisfactorily as a magnetic head for application of a read-head field.

Next, the sector format of the magneto-optical disc 1 will be described below:

The magneto-optical disc 1 adopts the ZCAV method and to have a sector format as shown in Table 1. The ZCAV method is such that to correct a difference in linear density between the lead-in and lead-out areas, the recording area on the magneto-optical disc is divided into a plurality of concentric recording bands and write to, and read from, each of the recording bands are done with a predetermined frequency.

information recorded by embossed pits formed on the substrate 2. During write and/or read, address information is detected from the address pit area as a change of reflected quantity of light.

In the magneto-optical recording area where an information signal is recorded by the magneto-optical recording, a higher resolution than determined by the wavelength of read tight can be attained owing to the above-mentioned MSR

TABLE 1

1 sector = 2694 bytes
Track pitch = 0.90 µm

| Recording band | Recording track | | Magneto-optical recoding area | Address pit area | Radial position (mm) | | Capacity (MB) | Shortest pig length (µm) |
|---|---|---|---|---|---|---|---|---|
| | Start | End | | | Start | End | | |
| Lead-in | −779 | −1 | 66.27 | 33.14 | 41.29 | 41.00 | | 0.389 |
| 0 | 0 | 2582 | 66.27 | 33.14 | 41.00 | 40.04 | 89.9 | 0.379 |
| 1 | 2583 | 5102 | 64.66 | 32.33 | 40.04 | 39.07 | 87.7 | 0.380 |
| 2 | 5103 | 7559 | 63.04 | 31.52 | 39.07 | 38.11 | 85.5 | 0.380 |
| 3 | 7560 | 9953 | 61.42 | 30.71 | 38.11 | 37.14 | 83.3 | 0.380 |
| 4 | 9954 | 12284 | 59.81 | 29.90 | 37.14 | 36.18 | 81.2 | 0.380 |
| 5 | 12285 | 14552 | 58.19 | 29.10 | 36.18 | 35.22 | 79.0 | 0.380 |
| 6 | 14553 | 16757 | 56.57 | 28.29 | 35.22 | 34.25 | 79.8 | 0.380 |
| 7 | 16758 | 18899 | 54.96 | 27.48 | 34.25 | 33.29 | 74.6 | 0.380 |
| 8 | 18900 | 20978 | 53.34 | 26.67 | 33.29 | 32.32 | 72.4 | 0.381 |
| 9 | 20979 | 22994 | 51.72 | 25.86 | 32.32 | 31.36 | 70.2 | 0.381 |
| 10 | 22995 | 24947 | 50.11 | 25.05 | 31.36 | 30.40 | 68.0 | 0.381 |
| 11 | 24948 | 26837 | 48.49 | 24.25 | 30.40 | 29.43 | 65.8 | 0.381 |
| 12 | 26838 | 28664 | 46.88 | 23.44 | 29.43 | 28.47 | 63.6 | 0.381 |
| 13 | 28665 | 30428 | 45.26 | 22.63 | 28.47 | 27.51 | 61.4 | 0.382 |
| 14 | 30429 | 32129 | 43.64 | 21.82 | 27.51 | 26.54 | 59.2 | 0.382 |
| 15 | 32130 | 33767 | 42.03 | 21.01 | 26.54 | 25.58 | 57.0 | 0.382 |
| 16 | 33768 | 35342 | 40.41 | 20.21 | 25.58 | 24.61 | 54.8 | 0.383 |
| 17 | 35343 | 36854 | 38.79 | 19.40 | 24.61 | 23.65 | 52.6 | 0.383 |
| Buffer_id | 36855 | 36890 | 38.79 | 19.40 | 23.65 | 23.63 | | 0.382 |
| Control | 36891 | 36926 | 19.40 | 19.40 | 23.63 | 23.58 | | 0.763 |
| zone | 36927 | 36962 | 38.79 | 19.40 | 23.58 | 23.56 | | 0.381 |
| Buffer_id | 36977 | 38411 | 37.18 | 18.59 | 23.56 | 22.59 | | 0.382 |
| Lead-out | | | | | | | | |
| Total | | | | | | | 1283.1 | |

As shown in Table 1, the magneto-optical disc 1 has 18 recording bands resulted from radial division of the recording area. In each of the recording bands, the sector size is 2694 bytes and track pitch of the recording track is 0.90 µm. For write and/or read of an information signal, the reference clock frequency is changed for each recording band while the magneto-optical disc 1 is being spun at a predetermined speed, so that the recording pits in each recording band have the same shortest length. Namely, the magneto-optical disc 1 adopts the ZCAV sector format in which the recording area is divided by 18 into bands 0 to 17. By changing the reference clock frequency for each recording band, the recording bands in all the recording bands are made to have the shortest length of about 0.38 µm. Owing to this sector format adopted, the magneto-optical disc 1 can have a recording capacity of about 1.28 GB which is approximately double that of the 5-fold density 3.5-inch magneto-optical disc.

In the magneto-optical disc 1, there is formed in the leading portion of a sector an address pit area where address information is pre-recorded by a convex-concave pattern. Other than the address pit area is a magneto-optical recording area to which an information signal is written by magneto-optical recording. The address pit area has address technology adopted. On the other hand, since the MSR technology cannot be adopted for the address pit area where address information is pre-recorded by a convex-concave pattern, the resolution is determined by the wavelength of the read light.

More specifically, when the wavelength λ of the read light is 680 nm and numerical aperture NA of the objective lens to focus the read light on the magneto-optical disc 1 is 0.55, the read limit of the optical system is about 0.63 µm, so that the shortest recording pit length of the address pit area has to be more than 0.63 µm. On the other hand, in the magneto-optical recording area, adoption of the above-mentioned MSR technology permits to reduce the recording pit length to about 0.4 µm or less.

Figure 5:
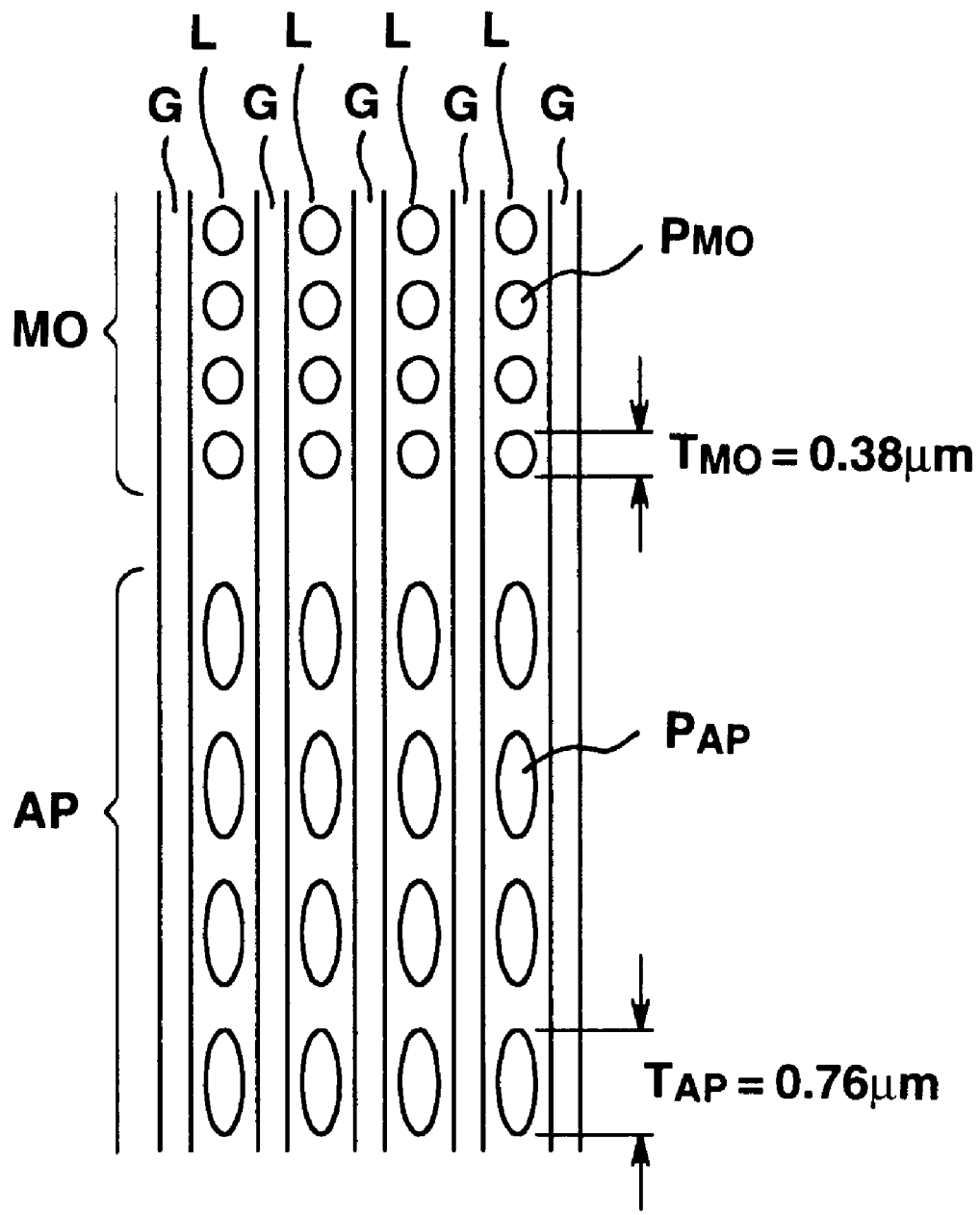
FIG. 5 shows the magneto-optical recording area and address pit area in the embodiment of magneto-optical disc according to the present invention.

As shown in FIG. 5, of the recording pits formed on a land L between grooves G on the magneto-optical disc 1, the shortest recording pit length $T_{MO}$ of a recording pit $P_{MO}$ formed in a magneto-optical recording area MO is made shorter than the shortest recording pit length $T_{AP}$ of a recording pit $P_{AP}$ formed in an address pit area AP. More particularly, the shortest recording pit length $T_{MO}$ in the magneto-optical recording area MO is 0.38 µm and the shortest recording pit length $T_{AP}$ in the address pit area AP is 0.76 µm. By making the shortest recording pit length $T_{MO}$ in the magneto-optical recording area MO thus different from the shortest recording pit length $T_{AP}$ in the address pit area AP, the recording density in the magneto-optical recording area MO can be improved without being restricted by the resolution in the address pit area AP.

Figure 6:
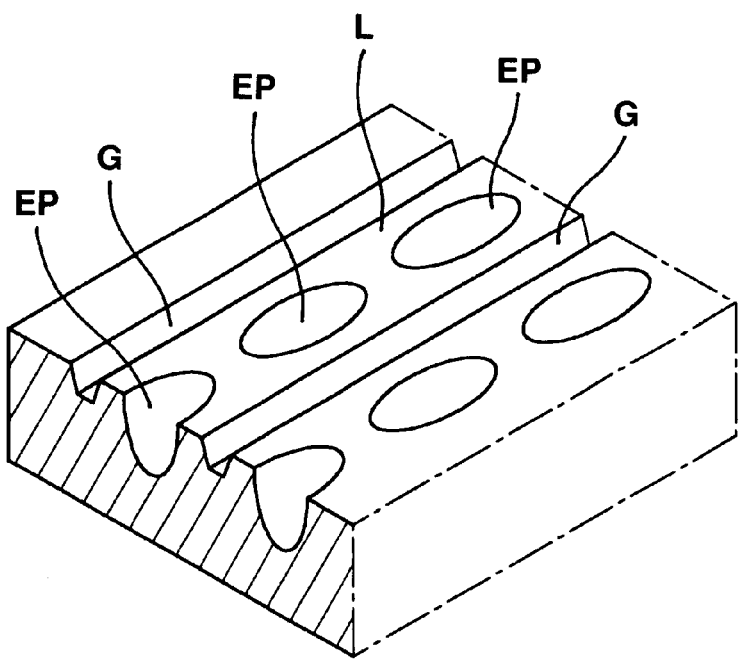
FIG. 6 shows, as enlarged in scale, a portion near the address pits on the substrate of a magneto-optical disc adopting the on-land recording method.

As shown in FIG. 6, the embossed pits EP formed in the address pit area AP are formed on the land L between the grooves G on the magneto-optical disc 1 adopting the on-land recording method. FIG. 6 shows, as enlarged in scale, a portion where the embossed pits EP are formed on the substrate 2 of a magneto-optical disc 1 adopting the on-land recording method.

Figure 7:
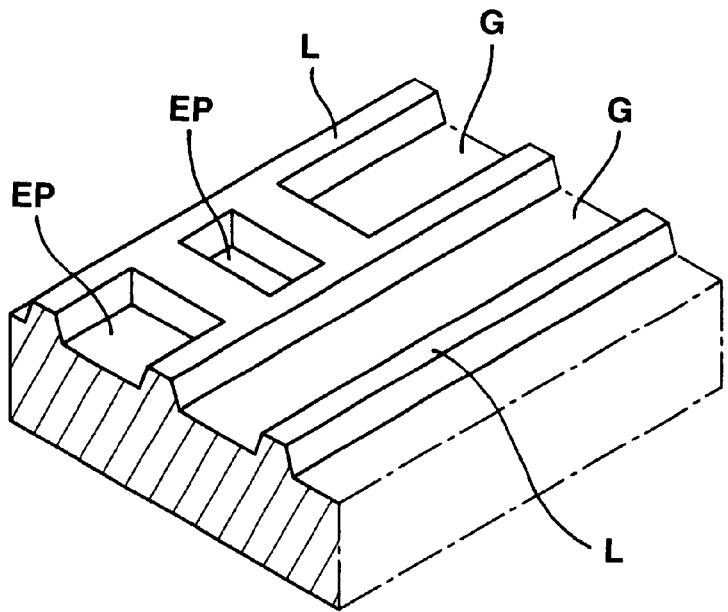
FIG. 7 shows, as enlarged in scale, a portion near the address pits on the substrate of a magneto-optical disc adopting the in-groove recording method.

When the in-groove recording method is adopted, the embossed pits EP formed in the address pit area AP are usually formed by removing the grooves G corresponding to the embossed pits EP as shown in FIG. 7 showing, as enlarged in scale, a portion where embossed pits EP are formed on the substrate of a magneto-optical disc adopting the in-groove recording method.

In the magneto-optical disc adopting the in-groove recording method, the groove G is as deep as the embossed pit EP because of its structure as shown in FIG. 7. Therefore, it is difficult to detect and extract a necessary signal for tracking servo control and a necessary modulation of the address pit area for reading address information, both at sufficient levels, respectively.

On the other hand, the magneto-optical disc adopting the on-land recording method is advantageous in that since the depth of the groove G and that of the embossed pit EP can be controlled separately as shown in FIG. 6, it is possible to detect and extract a necessary signal for tracking servo control and a necessary modulation of the address pit area for reading address information, both at sufficient levels, respectively.

Also, advantageously, the magneto-optical disc 1 adopting the on-land recording method can easily stand in the conventional 5-fold density 3.5-inch magneto-optical disc. More particularly, the conventional 5-fold density 3.5-inch magneto-optical disc adopts the on-land recording method, and thus the adoption of the on-land recording method also in the magneto-optical disc 1 according to the present invention makes it easy for the magneto-optical disc 1 to stand in the conventional 5-fold density 3.5-inch magneto-optical disc.

Introduction of the MSR technology in the magneto-optical disc 1 having the aforementioned construction enables a higher density of recording, and in addition, adoption of the on-land recording method in the magneto-optical disc 1 allows a smaller read-head field Hr which is applied for the MSR. Thus, the magneto-optical disc 1 according to the present invention can assure a higher recording density owing to the MSR technology adopted, and use a write magnetic head of a magneto-optical recording/reproducing apparatus as a magnetic head to apply a read-head field Hr. Hence, the magneto-optical disc 1 needs no special magnetic head to apply the read-head field Hr.

Further, an equivalent optical system (of which the light wavelength λ is 680 nm and numerical aperture NA is 0.55) to a standard optical system prescribed in the standard for the 5-fold density 3.5-inch magneto-optical disc (ISO/IEC 15041) can be used to write and read an information signal to/from the magneto-optical disc 1 according to the present invention. Therefore, the magneto-optical disc 1 can easily stand in the conventional 5-fold density 3.5-inch magneto-optical discs while maintaining a capacity (1.28 GB) two times larger than that of the 5-fold 3.5-inch magneto-optical discs.

Magneto-optical Recording/Reproducing Apparatus

Next, the magneto-optical recording/reproducing apparatus according to the present invention will be described herebelow concerning a magneto-optical recording/reproducing apparatus (will be referred to as "magneto-optical disc drive" hereinunder) adapted to write and read an information signal to/from the magneto-optical disc 1 according to the present invention, having been described in the foregoing.

It should be noted that the magneto-optical drive is adapted to write and read an information signal to/from the magneto-optical disc 1 as well as to/from a 5-fold density 3.5-inch magneto-optical disc. Namely, the magneto-optical disc drive is destined for a 10-fold density 3.5-inch magneto-optical disc while having a downward compatibility with the 5-fold density 3.5-inch magneto-optical disc.

Figure 8:
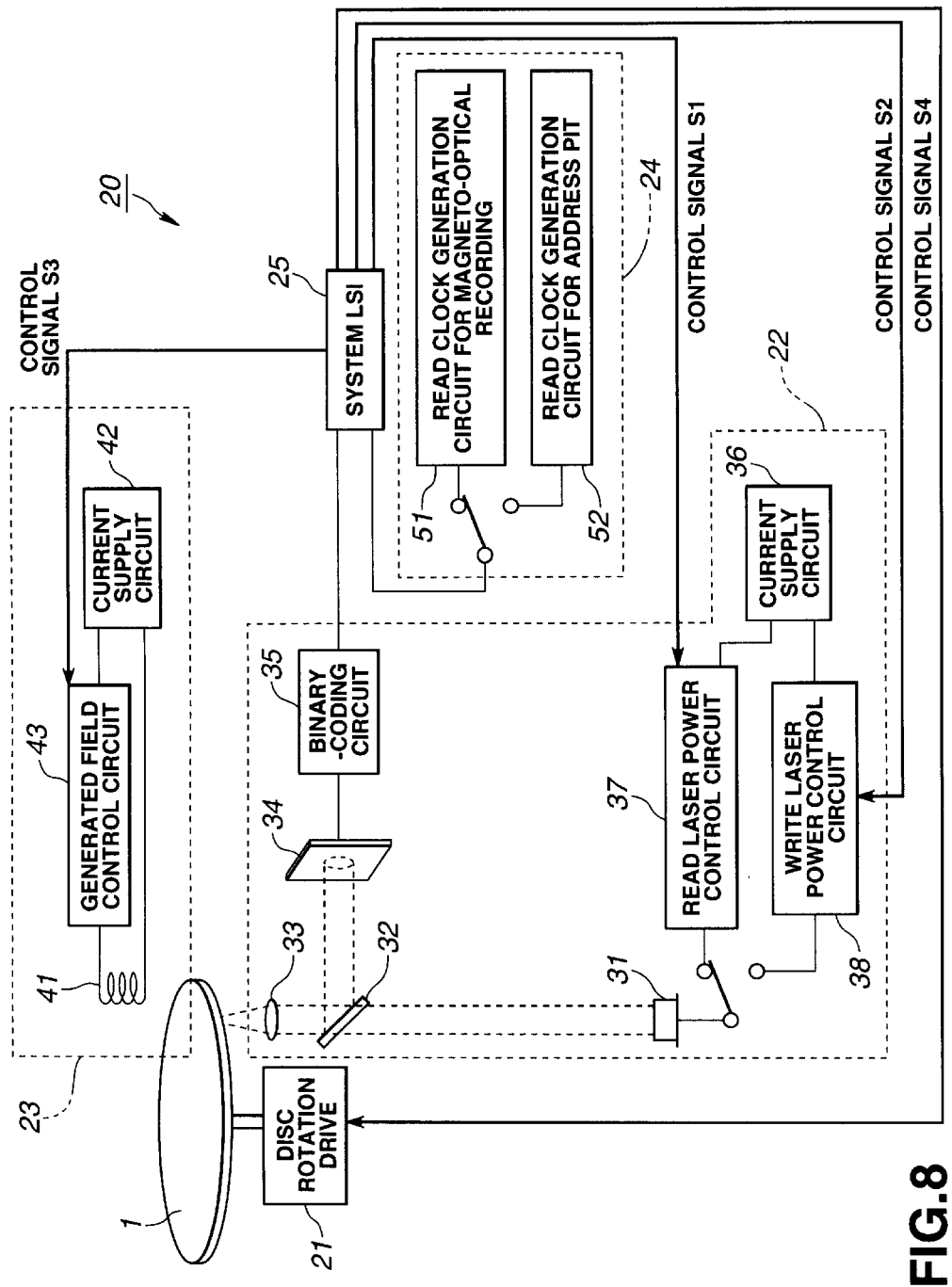
FIG. 8 shows an example of construction of the magneto-optical recording/reproducing apparatus according to the present invention.

Referring now to FIG. 8, there is schematically illustrated the construction of the magneto-optical disc drive according to the present invention. The magneto-optical disc drive is generally indicated with a reference 20. As shown, the magneto-optical disc drive comprises a disc rotation drive 21 to drive to spin the magneto-optical disc 1, an optical head unit 22 to irradiate a laser light to the magneto-optical disc 1, a magnetic head unit 23 to apply a magnetic field to the magneto-optical disc 1, a read clock generator 24 to generate a predetermined read clock, and a system LSI 25 to control the operation of the magneto-optical disc drive 20.

First, the optical head unit 22 of the magneto-optical disc drive 20 comprises a laser source 31 to irradiate a laser light, a polarizing beam splitter 32 disposed on the optical axis of the laser light emitted from the laser source 31, an objective lens 33 to focus on the magneto-optical disc 1 the laser light having been transmitted through the polarizing beam splitter 32, a photodetector 34 to detect a return part of the laser light from the magneto-optical disc 1, a binary coding circuit 35 to shape a signal from the photodetector 34 into a pulse signal, a current supply circuit 36 to supply a current to the laser source 31 for write or read to or from the magneto-optical disc 1, a read laser power control circuit 37 to control the magnitude of the current for supply to the laser source 31 in order to read an information signal from the magneto-optical disc 1, and a write laser power control circuit 38 to control the magnitude of the current for supply to the laser source in order to write an information signal to the magneto-optical disc 1.

More specifically, the optical head unit 22 comprises, in addition to the above components, a biaxial actuator for focusing servo control, tracking servo control, etc., another polarizing beam splitter to split the return light from the magneto-optical disc 1 into two beams having different directions, etc. Since these may be similar to the corresponding components used in the conventional magneto-optical disc drive, however, they will not be described any more.

In the optical head unit 22, the optical system is a one identical to the optical system used in the magneto-optical disc drive from the conventional 5-fold density 3.5-inch magneto-optical disc. Namely, the laser source 31 is adapted to emit a laser light of 680 nm in wavelength λ, and the objective lens 33 has a numerical aperture NA of 0.55. Thus, the magneto-optical disc drive 20 according to the present invention has a downward compatibility with the 5-fold density 3.5-inch magneto-optical disc.

Also, when the optical head unit 22 reads an information signal from the magneto-optical disc 1, the read laser power control circuit 37 controls the magnitude of a current for supply from the current supply circuit 36 to the laser source 31, thereby controlling the intensity of a laser light emitted from the laser source 31.

Figure 9:
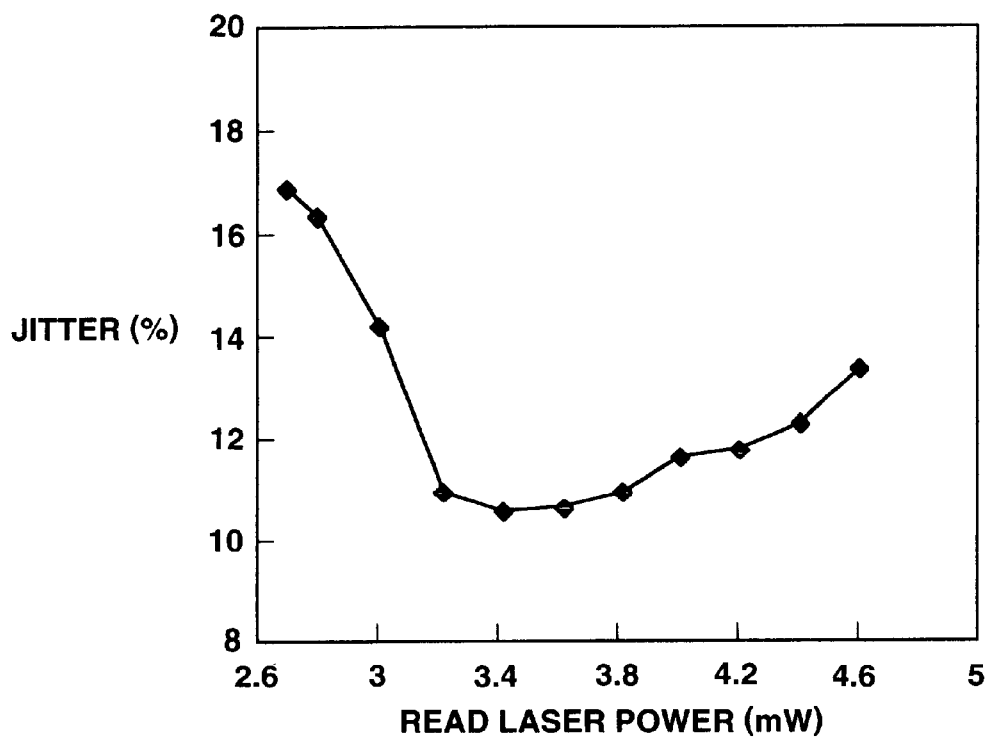
FIG. 9 graphically shows the dependence on the read laser power of jitter of the embodiment of magneto-optical disc according to the present invention.

As will be seen from FIG. 9, in the magneto-optical disc 1, the intensity (read laser power) of the laser light used for reading signal causes to change the quality of read signal. FIG. 9 shows a dependence on the read laser power of a ratio (jitter) with a channel clock T varying along the time base of a read signal produced by write and read of the random pattern under the conditions of a read-head field Hr of 24,000 A/m, linear velocity V of 7.9 m/s and a channel clock T of 24 nsec.

As shown in FIG. 9, in the magneto-optical disc 1, the quality of read signal is caused to change by the read laser power. So, when reading signal from the magneto-optical disc 1 in the magneto-optical disc drive 20, the read laser power is changed in a predetermined area on the magneto-optical disc 1 by the read laser power control circuit 37 to determine a read laser power which will provide an optimum read signal, and then signal is read from the magneto-optical disc 1. That is to say, the magneto-optical disc drive 20 according to the present invention is adapted to control the read laser power for reading signal from the magneto-optical disc 1 in order to optimize the conditions under which signal is read from the magneto-optical disc 1.

To attain the above-mentioned operation, a program designating the operation is written in the system LSI 25 and a control signal S1 for designating the operation is supplied from the system LSI 25 to the read laser power control circuit 37.

In the optical head unit 22, when writing signal to the magneto-optical disc 1, a current for supply from the current supply circuit 36 to the laser source 31 is controlled in magnitude by the write laser power control circuit 38 to control the intensity of a laser light emitted from the laser source 31.

As shown in FIG. 4, the intensity (write laser power) of a laser light used for writing signal to magneto-optical disc 1 causes to change the quality of read signal. To this end, when writing signal to the magneto-optical disc 1 in the magneto-optical disc drive 20, the write laser power is changed in a predetermined area on the magneto-optical disc 1 by the write laser power control circuit 38 to determine a write laser power for an optimum writing before doing the write to the magneto-optical disc 1. Namely, the magneto-optical disc drive 20 is adapted to control the write laser power for optimizing the conditions of writing signal to the magneto-optical disc 1.

To attain the above-mentioned operation, a program designating the operation in consideration is written in the system LSI 25 and a control signal S2 for designating the operation is supplied from the system LSI 25 to the write laser power control circuit 38.

The magnetic head unit 23 of the magneto-optical disc drive 20 comprises a magnetic head 41 to apply a magnetic field to the magneto-optical disc 1, a current supply circuit 42 to supply a current to the magnetic head 41 for write and read of signal to the magneto-optical disc 1, and a generated field control circuit 43 to control the magnitude of a current for supply to the magnetic head 41 for write and read signal to the magneto-optical disc 1.

When writing an information signal to the magneto-optical disc 1 (including erasure of an information signal already written on the magneto-optical disc 1) and reading an information signal already written on the magneto-optical disc 1, the magnetic head unit 23 applies a magnetic field to the magneto-optical disc 1.

Also, when the magnetic head unit 23 reads or writes an information signal from/to the magneto-optical disc 1, the generated field control circuit 43 controls the magnitude of a current for supply from the current supply circuit 42 to the magnetic head 41, thereby controlling the strength of a magnetic field for application to the magneto-optical disc 1.

Figure 10:
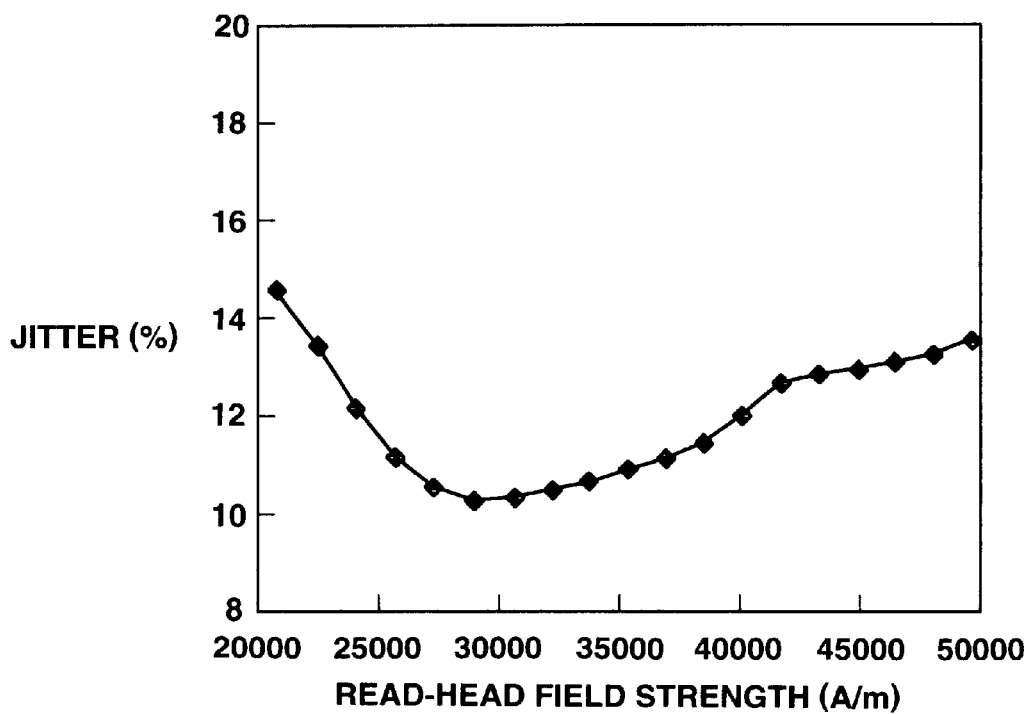
FIG. 10 graphically shows the dependence on the strength of read-head field of jitter of the embodiment of magneto-optical disc according to the present.

As will be seen from FIG. 10, the strength of read-head field causes to change the quality of read signal. FIG. 10 shows a dependence on the strength of read-head field of a ratio (jitter) with a channel clock T varying along the time base of a read signal produced by write and read of the random pattern under the conditions of a read laser power Pr of 3.5 mW, linear velocity V of 7.9 m/s and a channel clock T of 24 nsec.

As shown in FIG. 10, in the magneto-optical disc 1, the quality of read signal is caused to change by the strength of read-head field applied to the magneto-optical disc 1. So, when reading signal from the magneto-optical disc 1 in the magneto-optical disc drive 20, the strength of read-head field is changed in a predetermined area on the magneto-optical disc 1 by the generated field control circuit 43 to determine a strength of read-head field which will provide an optimum read signal, and then signal is read from the magneto-optical disc 1. That is to say, the magneto-optical disc drive 20 according to the present invention is adapted to control the strength of read-head field for writing signal to the magneto-optical disc 1 in order to optimize the conditions under which signal is read from the magneto-optical disc 1.

To attain the above-mentioned operation, a control signal S3 for designating the operation in consideration is supplied from the system LSI 25 to the generated field control circuit 43.

The read clock generator 24 of the magneto-optical disc drive 20 comprises a read clock generation circuit 51 for the magneto-optical recording area MO to generate a read clock corresponding to the recording pit length in the magneto-optical recording area MO on the magneto-optical disc 1, and a read clock generation circuit 52 for the address pit area AP to generate a read clock corresponding to the recording pit length in the address pit area AP on the magneto-optical disc 1.

As having previously been described, the shortest recording pit length $T_{MO}$ in the magneto-optical recording area MO where an information signal is written by the magneto-optical recording is different from the shortest recording pit length $T_{AP}$ in the address pit area AP where address information is written by embossed pits. Therefore, the magneto-optical disc drive 20 is adapted to read an information signal from the magneto-optical disc 1 by selecting the reference clock frequency for each of the areas MO and AP.

For reading an information signal from the magneto-optical recording area MO, the read clock generation circuit 51 for the magneto-optical recording area generates a read clock corresponding to the recording pit length in the magneto-optical recording area MO and based on which the information signal is read. For reading an information signal from the address pit area AP, the read clock generation circuit 52 for the address pit area AP generates a rad clock corresponding to the recording pit length in the address pit area AP and based on which the information signal is read.

Next, read of an information signal from the magneto-optical disc 1 by the magneto-optical disc drive 20 constructed as having been described in the foregoing, will be described below:

First, the magneto-optical disc 1 is set in the disc rotation drive 21 which will be driven based on a control signal S4 from the system LSI 25.

Then, the current supply circuit 42 of the magnetic head unit 23 supplies a current to the magnetic head 41 which will apply a read-head field Hr to the magneto-optical disc I being driven to spin by the disc rotation drive 21. At this time, the read-head field Hr is changed in strength in a predetermined area on the magneto-optical disc 1 by the generated field control circuit 43 based on the control signal S3 from the system LSI 25 as mentioned in the foregoing, to determine a read-head field strength for an optimum read signal. Then, a current supplied from the current supply circuit 42 to the magnetic head 41 is controlled by the generated field control circuit 43 to apply to the magneto-optical disc 1 a read-head field Hr having a strength for the optimum read signal.

Further, while the read-head field Hr is applied to the magneto-optical disc 1, a current is supplied from the current supply circuit 36 of the optical head unit 22 to the laser source 31 which will emit a laser light. At this time, the read laser power is changed in a predetermined area on the magneto-optical disc 1 based on the control signal S1 from the system LSI 25 by the read laser power control circuit 37 to determine a read laser power for an optimum read signal. Then, the current supplied from the current supply circuit 36 to the laser source 31 is controlled by the read laser power control circuit 37 so that the laser light emitted from the laser source 31 has an intensity for the optimum read signal.

Thus, the laser light emitted from the laser source 31 is incident upon the objective lens 33 through the polarizing beam splitter 32, and focused on the magneto-optical disc 1 by the objective lens 33. The laser light is reflected by the magneto-optical disc 1, and the return light is reflected by the polarizing beam splitter 32 and guided to the photodetector 34 which will thus detects the laser light.

The photodetector 34 detects a change of the plane of polarization of the return light due to the Kerr effect in the read-out layer 4a of the recording layer 4 of the magneto-optical disc 1 and converts it to an electrical signal which is provided as an output. The electrical signal output from the photodetector 34 is supplied to the binary coding circuit 35 in which it will be shaped into a pulse signal which will further be sent to the system LSI 25.

Based on a read clock supplied from the read clock generator 24, the system LSI 25 converts the pulse signal to a digital data of 0 or 1. Thus, an information signal recorded in the magneto-optical disc 1 is read as a digital data of 0 or 1. Note that the system LSI 25 may adopt, for the purpose of signal processing, the PRML (partial response maximum likelihood) to improve a signal deteriorated due to the high density of recording.

In the magneto-optical disc drive 20, for reading an information signal recorded in the magneto-optical disc 1, a read clock sent from the read clock generator 24 to the system LSI 25 is changed for each of the magneto-optical recording area MO and address pit area AP.

To read an information signal from the magneto-optical recording area MO, the read clock generation circuit 51 of the read clock generator 24 generates a read clock of a frequency corresponding to the recording pit length in the magneto-optical recording area MO as mentioned above. The system LSI 25 reproduces the information signal from the magneto-optical recording area MO based on the read clock from the read clock generation circuit 51 for the magneto-optical recording area MO. On the other hand, for reading an information signal from the address pit area AP, the read clock generation circuit 52 for the address pit area AP generates a read clock having a frequency corresponding to the recording pit length in the address pit area AP. The LSI 25 reproduces the information signal from the address pit area AP based on the read clock from the read clock generation circuit 52 for the address pit area AP.

For writing an information signal to the magneto-optical disc 1 by means of the magneto-optical disc drive 20, first the magneto-optical disc 1 is set into the disc rotation drive 21 which will drive the disc rotation drive 21 based on the control signal S4 from the system LSI 25.

Next, the current supply circuit 42 of the magnetic head unit 23 supplies a current to the magnetic head 41 which will apply a write magnetic field to the magneto-optical disc 1 being driven to spin by the disc rotation drive 21. While the write field is applied to the magneto-optical disc 1, the current supply circuit 36 supplies a current to the laser source 31 which will thus emit a laser light. As having been described in the above, based on the control signal S2 from the system LSI 25, the write laser power control circuit 38 changes the write laser power in a predetermined area on the magneto-optical disc 1 to determine a write laser power for an optimum write to the magneto-optical disc 1. Also the write laser power control circuit 38 controls the current supplied from the current supply circuit 36 to the laser source 31 so that the laser light emitted from the laser source 31 will have an intensity for the optimum write to the magneto-optical disc 1. The laser light emitted from the laser source 31 is incident upon the objective lens 33 through the polarizing beam splitter 32 and focused by the objective lens 33 on the magneto-optical disc 1.

For writing an information signal to the magneto-optical disc 1, a signal corresponding to a data to be written is supplied from the system LSI 25 to the generated field control circuit 43 which will modulate the magnetic field for application to the magneto-optical disc 1 so as to correspond to the data to be written. Thus, the data is written magneto-optically to the magneto-optical disc 1.

Note that an information signal may not be written to the magneto-optical disc 1 by the above-mentioned field strength modulation, but may be written to the magneto-optical disc 1 by the so-called light intensity modulation in which with the strength of a magnetic field applied to the magneto-optical disc 1 kept constant, the intensity of laser light irradiated to the magneto-optical disc 1 is modulated by the write laser power control circuit 38 so as to correspond to a data to write.

In the description given above, the operations including the tracking servo control, focusing servo control, etc. have not been described. However, the magneto-optical disc drive 20 is also adapted to effect a tracking servo control, focusing servo control, etc. for writing and reading as in the conventional magneto-optical disc drive.

The magneto-optical disc drive 20 having been described in the foregoing can write and read an information signal to/from the magneto-optical disc 1 according to the present invention and which has also previously been described, and is compatible with a 5-fold density 3.5-inch magneto-optical disc. That is to say, the magneto-optical disc drive 20 can use an optical system equivalent to the standard optical system prescribed in the standard for the 5-fold density 3.5-inch magneto-optical disc (ISO/IEC 15041) to write and read an information signal to/from the 5-fold density 3.5-inch magneto-optical disc as well.

As having been described in the foregoing, the present invention provides a magneto-optical recording medium adopting the MSR technology for a higher recording density and in which a read-head field for application to the magneto-optical recording medium to attain the MSR may be small, and a magneto-optical recording/reproducing apparatus for write and/or read to/from the magneto-optical recording medium.

Therefore, according to the present invention, no special magnetic head for application of a read-head field to the magneto-optical recording medium magneto-optical recording/reproducing apparatus, and the MSR technology can be applied to enable a further higher density of the magneto-optical recording/reproduction.

As a result, the magneto-optical recording/reproducing apparatus according to the present invention can write and/or read an information signal to/from a 10-fold density 3.5-inch magneto-optical recording medium and it has a downward compatibility with a 5-fold density 3.5-inch magneto-optical recording medium.

Although modifications and changes may be suggested by those skilled in the art, it is the intention of the inventors to embody within the patent warranted hereon all changes and modifications as reasonably and properly come within the scope of their contribution to the art.

What is claimed is:

1. A magneto-optical recording medium operatively configured for storage and readout of information using on-land only recording and double-mask rear aperture direction methods, comprising:
   a substrate having lands and grooves formed along a recording track; and
   a recording layer formed on the substrate and consisting of a stack of at least three magnetic layers, the magneto-optical recording medium being adapted such that:
      information signals are written thereto by an on-land only recording method in which information signal is written to the lands only; and
      for reading the information signals therefrom, a magnetic field is applied thereto so that a magnetic layer irradiated with a read light is magnetized in one direction in a part of the magnetic layer within a read light spot and the information signals are readout using a double-mask rear aperture detection method.

2. The magneto-optical recording medium as set forth in claim 1, wherein when an information signal is read therefrom, a read-head magnetic head is applied for the magnetic layer irradiated with a read light to be magnetized in predetermined directions in front and rear portions, respectively, lying in relation to the moving direction of the read light spot, of an area within the read light spot.

3. The magneto-optical recording medium as set forth in claim 1, wherein the read-head field need only be 28,000 A/m or less in strength.

4. A magneto-optical recording medium operatively configured for storage and readout of information using on-land only recordings and double-mask rear aperture direction methods, comprising:
   a substrate having lands and grooves formed along a recording track; and
   a recording layer formed on the substrate and consisting of a stack of at least three magnetic layers, the magneto-optical recording medium being adapted such that:
      information signals are written thereto by an on-land only recording method in which information signal is written to the lands only; and
      for reading the information signals therefrom, a magnetic field is applied thereto so that a magnetic layer irradiated with a read light is magnetized in one direction in a part of the magnetic layer within a read light spot and the information signals are readout using a double-mask rear aperture detection method, and
   formed like a disc and having a plurality of recording bands defined by dividing a recording area radially thereof, and spun at a predetermined speed with a write or read light focused within at least each of the recording bands when information signal is written or read to/from the magneto-optical recording medium, the rotational speed or reference clock frequency being changed for each of the recording bands.

5. A magneto-optical recording medium operatively configured for storage and readout of information using on-land only recording and double-mask rear aperture direction methods, comprising:
   a substrate having, lands and grooves formed along a recordings track; and
   a recording layer formed on the substrate and consisting of a stack of at least three magnetic layers, the magneto-optical recording medium being adapted such that:
      information signals are written thereto by an on-land only recording method in which information signal is written to the lands only;
      for reading the information signals therefrom, a magnetic field is applied thereto so that a magnetic layer irradiated with a read light is magnetized in one direction in a part of the magnetic layer within a read light spot and the information signals are readout using a double-mask rear aperture detection method, and
   having a magneto-optical recording area in which information signal are recorded by the magneto-optical recording, and a pit area in which an information signal is pre-recorded by a convex-concave pattern, the shortest recording pit length in the magneto-optical recording area being smaller than that in the pit area.

6. A magneto-optical recording medium operatively configured for storage and readout of information using on-land only recording and double-mask rear aperture direction methods, comprising:
   a substrate having lands and grooves formed along a recording track; and
   a recording layer formed on the substrate and consisting of a stack of at least three magnetic layers, the magneto-optical recording medium being adapted such that:
      information signals are written thereto by an on-land only recording method in which information signal is written to the lands only;
      for reading the information signals therefrom, a magnetic field is applied thereto so that a magnetic layer irradiated with a read light is magnetized in one direction in a part of the magnetic layer within a read light spot and the information signals are readout using a double-mask rear aperture detection method,
   wherein the shortest recording pit length in the pit area is an integral multiple of that in the magneto-optical recording area.

7. A magneto-optical recordings medium operatively configured for storage and readout of information using on-land only recording and double-mask rear aperture direction methods, comprising:
   a substrate having lands and grooves formed along a recording track; and a recording layer formed on the substrate and consisting of a stack of at least three magnetic layers, the magneto-optical recording medium beings adapted such that:

information signals are written thereto by an on-land only recording method in which information signal is written to the lands only;

for reading the information signals therefrom, a magnetic field is applied thereto so that a magnetic layer irradiated with a read light is magnetized in one direction in a part of the magnetic layer within a read light spot and the information signals are readout using a double-mask rear aperture detection method, and having a magneto-optical recording area in which information signal are recorded by magneto-optical recording, and a pit area in which an information signal is pre-recorded by a convex-concave pattern, the shortest recording pit length in the magneto-optical recording area being smaller than that in the pit area, and wherein:
the shortest recording pit length in the magneto-optical recording area is 0.38 µm or less.

8. The magneto-optical recording medium as set forth in claim 1, wherein the track pitch is 0.9 µm or less.

9. A magneto-optical recording/reproducing apparatus for writing and/or reading information signal to/from a magneto-optical recoding medium having a substrate having lands and grooves formed along a recording track; and a recording layer formed on the substrate and consisting of a stack of at least three magnetic layers, the apparatus configured to:

write information signals to the magneto-optical recording medium by an on-land only recording method in which information signal is written to the lands only; and apply a magnetic field to the magneto-optical recording medium when reading information signals written on the magneto-optical recording medium, so that a magnetic layer irradiated with a read light is magnetized in one direction in a part of the magnetic layer within a read light spot and the information signals are read out using a double-mask rear aperture detection method.

10. The magneto-optical recording/reproducing apparatus as set forth in claim 9, further comprising:

means for optimizing the strength of the magnetic field applied to the magneto-optical recording medium to read information signal from the magneto-optical recording medium;

means for optimizing the intensity of the read light irradiated to the magneto-optical recording medium to read information signal from the magneto-optical recording medium; and means for optimizing the intensity of a light irradiated to the magneto-optical recording medium to write information signal to the magneto-optical recording medium these means enable information signal write and read under optimum conditions.

11. The magneto-optical recording/reproducing apparatus as set forth in claim 9, wherein when an information signal is read therefrom, the magnetic field is applied for the magnetic layer irradiated with a read light to be magnetized in predetermined directions in front and rear portions, respectively, lying in relation to the moving direction of the read light spot, of an area within the read light spot.

12. The magneto-optical recording/reproducing apparatus as set forth in claim 9, wherein the magnetic field is 28,000 A/m or less in strength.

13. A magneto-optical recording/reproducing apparatus for writing and/or reading information signal to/from a magneto-optical recoding medium having a substrate having lands and grooves formed along a recording track; and a recording layer formed on the substrate and consisting of a stack of at least three magnetic layers, the apparatus configured to:

write information signals to the magneto-optical recording medium by an on-land only recording method in which information signal is written to the lands only; and apply a magnetic field to the magneto-optical recording medium when reading information signals written on the magneto-optical recording medium, so that a magnetic layer irradiated with a read light is magnetized in one direction in a part of the magnetic layer within a read light spot and the information signals are read out using a double-mask rear aperture detection method, wherein the magneto-optical recording medium for use therewith is formed in a disc shape, has a plurality of recording bands defined by dividing a recording area radially thereof, and spun at a predetermined speed with a write or read light focused within at least each of the recording bands when information signal is written or read to/from the magneto-optical recording medium, the rotational speed or reference clock frequency being changed for each of the recording bands.

14. A magneto-optical recording/reproducing apparatus for writing and/or reading information signal to/from a magneto-optical recoding medium having a substrate having lands and grooves formed along a recording track; and a recording layer formed on the substrate and consisting of a stack of at least three magnetic layers, the apparatus configured to:

write information signals to the magneto-optical recording medium by an on-land only recording method in which information signal is written to the lands only;

apply a magnetic field to the magneto-optical recording medium when reading information signals written on the magneto-optical recording medium, so that a magnetic layer irradiated with a read light is magnetized in one direction in a part of the magnetic layer within a read light spot and the information signals are read out using a double-mask rear aperture detection method, further comprising, for use with a magneto-optical medium having a magneto-optical recording area in which an information signal is recorded by the magneto-optical recording, and a pit area in which an information signal is pre-recorded by a convex-concave pattern;

means for generating a read clock corresponding to a recording pit length in the magneto-optical recording area; and means for generating a read clock corresponding to a recording pit length in the pit area.

15. The magneto-optical recording medium of any of claims 1–8 wherein the read head field need only be 20,000–28,000 A/m or less.

16. The magneto-optical recording medium of any of claims 1–8 wherein the read head field need only be 4,000 A/m or less.

17. The magneto-optical recording/reproducing apparatus of any of claims 9–14, wherein the magnetic field applied is 20,000–28,000 A/m or less.

18. The magneto-optical recording/reproducing apparatus of any of claims 9–14, wherein the magnetic field applied is 4,000 A/m or less.

* * * * *